(12) United States Patent  
Stevens

(10) Patent No.: US 8,413,074 B2  
(45) Date of Patent: Apr. 2, 2013

(54) MECHANISM FOR COLLABORATIVELY EXCHANGING NAVIGATION INFORMATION IN A DISTRIBUTED DOCUMENT REVIEW

(75) Inventor: Matthew J. Stevens, Malvern, PA (US)

(73) Assignee: Oracle America, Inc., Redwood Shores, CA (US)

( * ) Notice: Subject to any disclaimer, the term of this patent is extended or adjusted under 35 U.S.C. 154(b) by 379 days.

(21) Appl. No.: 12/705,505

(22) Filed: Feb. 12, 2010

(65) Prior Publication Data

US 2010/0146403 A1  Jun. 10, 2010

Related U.S. Application Data

(63) Continuation of application No. 11/441,621, filed on May 26, 2006, now abandoned.

(51) Int. Cl.
*G06F 3/048* (2006.01)

(52) U.S. Cl. ........ 715/854; 715/728; 715/747; 715/752; 715/753; 715/763; 715/765; 715/785; 715/786; 715/817

(58) Field of Classification Search .................. 715/751, 715/758, 728, 747, 752, 753, 763, 765, 785, 715/786, 817, 854

See application file for complete search history.

(56) References Cited

U.S. PATENT DOCUMENTS

| | | | | |
|---|---|---|---|---|
| 5,583,993 A * | 12/1996 | Foster et al. | ........... | 709/205 |
| 5,724,508 A * | 3/1998 | Harple et al. | ........... | 709/205 |
| 5,915,098 A * | 6/1999 | Palmer et al. | ........... | 709/247 |
| 6,151,020 A * | 11/2000 | Palmer et al. | ........... | 715/733 |
| 6,195,091 B1 * | 2/2001 | Harple et al. | ........... | 715/751 |
| 6,292,166 B1 * | 9/2001 | Palmer et al. | ........... | 345/589 |
| 6,557,028 B2 * | 4/2003 | Cragun | ........... | 709/205 |
| 6,879,997 B1 * | 4/2005 | Ketola et al. | ........... | 709/208 |
| 6,934,737 B1 * | 8/2005 | Tang et al. | ........... | 709/204 |
| 6,938,212 B2 * | 8/2005 | Nakamura | ........... | 715/748 |
| 7,003,728 B2 * | 2/2006 | Berque | ........... | 715/753 |
| 7,028,266 B2 * | 4/2006 | Ben-Shachar et al. | ........... | 715/790 |
| 7,197,751 B2 * | 3/2007 | Fedotov et al. | ........... | 719/323 |
| 7,206,811 B2 * | 4/2007 | Skurikhin et al. | ........... | 709/205 |
| 7,213,211 B1 * | 5/2007 | Sanders et | ........... | 715/753 |
| 7,219,127 B2 * | 5/2007 | Huck et al. | ........... | 709/204 |
| 7,222,305 B2 * | 5/2007 | Teplov et al. | ........... | 715/751 |
| 7,414,638 B2 * | 8/2008 | Ben-Shachar et al. | ........... | 345/629 |
| 7,516,179 B2 * | 4/2009 | Huck et al. | ........... | 709/204 |
| 7,595,798 B2 * | 9/2009 | Ben-Shachar et al. | ........... | 345/418 |
| 7,721,223 B2 * | 5/2010 | Ben-Shachar et al. | ........... | 715/790 |

(Continued)

OTHER PUBLICATIONS

Ask Search Engine NPL Search, ask search q=collaborative+scroll &qsrc=0&o=0&1=dir, searched Dec. 4, 2012.*

(Continued)

*Primary Examiner* — Boris Pesin  
*Assistant Examiner* — John Heffington  
(74) *Attorney, Agent, or Firm* — Osha Liang LLP

(57) ABSTRACT

A mechanism for enabling nodes on a network to collaboratively exchange sets of rendering information respecting a file. Each node maintains its own copy of the file, and each node may access its copy of the file. Whenever a node does access the locations of the file, that node sends out a rendering information message. The rendering information message comprises the set of rendering information for the file that has been updated. The rendering information message is forwarded to each of the other nodes. When each of the other nodes receives the rendering information message, it stores the set of rendering information contained therein to a rendering history associated with a user. In this manner, histories of access in the file by all users are exchanged among the nodes, and the user on each node is able to see rendering information generated by users on the other nodes.

20 Claims, 8 Drawing Sheets

U.S. PATENT DOCUMENTS

| | | | |
|---|---|---|---|
| 8,001,126 B2 * | 8/2011 | Berry et al. | 707/737 |
| 8,082,517 B2 * | 12/2011 | Ben-Shachar et al. | 715/781 |
| 2002/0083098 A1 * | 6/2002 | Nakamura | 707/513 |
| 2003/0009521 A1 * | 1/2003 | Cragun | 709/205 |
| 2003/0061286 A1 * | 3/2003 | Lin | 709/205 |
| 2003/0167281 A1 * | 9/2003 | Cohen et al. | 707/103 R |
| 2003/0189599 A1 * | 10/2003 | Ben-Shachar et al. | 345/790 |
| 2004/0049539 A1 * | 3/2004 | Reynolds et al. | 709/203 |
| 2004/0158586 A1 * | 8/2004 | Tsai | 707/200 |
| 2004/0179036 A1 * | 9/2004 | Teplov et al. | 345/751 |
| 2004/0181577 A1 * | 9/2004 | Skurikhin et al. | 709/204 |
| 2004/0181579 A1 * | 9/2004 | Huck et al. | 709/205 |
| 2004/0181796 A1 * | 9/2004 | Fedotov et al. | 719/323 |
| 2005/0204296 A1 * | 9/2005 | Rossler et al. | 715/751 |
| 2005/0257153 A1 * | 11/2005 | Ben-Shachar et al. | 715/731 |
| 2005/0257165 A1 * | 11/2005 | Ben-Shachar et al. | 715/781 |
| 2006/0136127 A1 * | 6/2006 | Coch et al. | 701/208 |
| 2006/0155785 A1 * | 7/2006 | Berry et al. | 707/204 |
| 2006/0190839 A1 * | 8/2006 | Ben-Shachar et al. | 715/781 |
| 2007/0079249 A1 * | 4/2007 | Pall et al. | 715/758 |
| 2007/0185958 A1 * | 8/2007 | Huck et al. | 709/204 |
| 2007/0185959 A1 * | 8/2007 | Huck et al. | 709/204 |
| 2007/0214423 A1 * | 9/2007 | Teplov et al. | 715/751 |
| 2009/0094288 A1 * | 4/2009 | Berry et al. | 707/104.1 |
| 2011/0289429 A1 * | 11/2011 | Berry et al. | 715/752 |

OTHER PUBLICATIONS

Ask Search Engine NPL Search, ask search qsrc=1&o=0&l=dir &q=group+scroll, searched Dec. 4, 2012.*

Ask Search Engine NPL Search, ask search qsrc=1&o=0&l=dir &q=remote+scroll, searched Dec. 4, 2012.*

Ask Search Engine NPL Search, ask search qsrc=1&o=0&l=dir &q=shared+scroll, searched Dec. 4, 2012.*

* cited by examiner

MECHANISM FOR COLLABORATIVELY EXCHANGING NAVIGATION INFORMATION IN A DISTRIBUTED DOCUMENT REVIEW

CROSS-REFERRENCE TO RELATED APPLICATIONS

This application is a continuation of U.S. patent application Ser. No. 11/441,621, entitled: "MECHANISM FOR COLLABORATIVELY EXCHANGING NAVIGATION INFORMATION IN A DISTRIBUTED DOCUMENT REVIEW", and filed on May 26, 2006.

BACKGROUND

In many work scenarios, it is desirable for a plurality of workers to collaborate on a project to find a solution to a problem. For example, in the context of software development, it is often desirable for a plurality of developers to review the source code for a particularly difficult part of a program. With such collaboration, the software defects are often discovered faster than if the individuals had read the code by themselves.

Collaboration can be achieved in many different ways. One possible way is to physically gather all of the people so that they are present and working together in the same location. With workers spread throughout the country and throughout the world, however, this is often not practical. Collaboration may also be achieved electronically. With tools such as instant messaging, email, and electronic file transfer, workers can collaborate by sending messages and files to each other. For example, a developer may ask a colleague to review a piece of source code under a source code control system that both can access and send back any comments about the piece of source code. While these tools do enable workers to communicate and exchange ideas, they do not truly enable the workers to collaborate in the full sense of the word. Each worker cannot see what portion of code the other is reviewing while he is doing it, and there are often significant delays between the request for information/advice and the receipt thereof. Thus, the collaboration is not very interactive.

To facilitate more interactive collaboration, some computing tools have been developed in recent years that allow multiple parties using multiple machines (e.g. computers) to view a file at the same time. With such tools, a file may be opened for display by one of the workers, and may be viewed by all of the other workers. The worker who opened the file for display can use a pointing or highlighting device such as a mouse to signal to others a location on a displayed portion of the file. Some of these tools even allow different workers to take turns to open and display a file and direct others' attention to a displayed portion of the file. Typically, this is done by conveying an image on a computer controlled by one worker to computers controlled by other workers. A disadvantage of these tools is that everyone has to look at the same portion of the file at the same time; if a worker wants to look at something else, either he has to take over as the leader (which forces everyone else to look at what he wants to look at) or he can look at the other thing separately and miss out on the current discussion. If he misses on the discussion, he cannot go back to see what was discussed by the other workers.

Because of these limitations, the existing tools are not as fully interactive and collaborative as would be desired. As a result, an improved collaboration mechanism is needed.

SUMMARY

In accordance with one embodiment of the present invention, there is provided a system which enables multiple users on multiple nodes of a network to fully and interactively collaborate on a file. In one embodiment, this collaboration is achieved by having the nodes exchange rendering information with each other. In one embodiment, this system comprises a plurality of nodes, and a network for communicatively coupling the nodes. The system may further optionally comprise a message broker for facilitating information exchange between the nodes. In one embodiment, each node maintains its own copy of the file upon which collaboration is to be performed.

In one embodiment, to carry out collaboration, a first node renders a first portion of a file to a first user. After rendering this first portion of the file, the first node sends out a set of rendering information. In one embodiment, this rendering information comprises an identifier for the file that has been rendered, and some positioning information from which it can be determined which portion of the file has been rendered. The rendering information may also include some cursor information (indicating a location within the first portion of the file at which a cursor has been placed by the first user) and some selection information (indicating which section within the first portion of the file has been selected by the first user). Basically, the rendering information may include any and all information that specifies what has been rendered to the first user by the first node. In one embodiment, this rendering information is sent to the message broker (as an alternative, the first node may broadcast the rendering information to all of the nodes in the system that are collaborating on the file).

In response, the message broker forwards the rendering information to a second node. After receiving the rendering information, the second node accesses a copy of the file whose identifier is specified in the rendering information. The second node then applies the positioning information within the rendering information to the file to determine which portion of the file has been rendered by the first node. The second node may further apply the cursor information and the selection information to this portion of the file. Thereafter, the second node renders this portion of the file to a second user. By doing so, the second node enables the second user to see on the second node what the first user is seeing on the first node. Collaboration on the file is thus enabled.

In one embodiment, as the first user on the first node causes the rendering of the file to change (e.g. by scrolling to another portion of the file, by selecting another section of the portion, by moving the cursor, etc.), the first node sends out additional sets of rendering information. These additional sets of rendering information enable the second node to track the renderings on the first node; thus, the second user can continue to see what the first user is seeing. In one embodiment, as the second node receives the sets of rendering information sent out by the first node, the second node stores the sets of rendering information. As a result, the second node maintains a rendering history for the first node.

To illustrate how this rendering history may be used advantageously in accordance with one embodiment of the present invention, suppose that after following the first user for a while, the second user decides that he wants to see a different portion of the file, or a different file altogether. The second user may do so by instructing the second node to stop following the first node. Once that is done, the second node may be used by the second user for any desired purpose (e.g. to look at a different portion of the file). While the second node is being used for this purpose, the second node continues to receive and store the sets of rendering information sent out by the first node; thus, the rendering history is still being maintained. When the second user decides to follow the first user again, he can instruct the second node to resume following the first node. Because the rendering history has been maintained, the second user can choose to resume following the first user at the point where he previously stopped following the first user, at the current point, or at any other point in time. Thus, with the rendering history, it is possible for a user to temporarily leave a collaboration discussion, and to come back at a later time at the point at which he left off.

In one embodiment, each node in the system may receive rendering information sets from multiple nodes; thus, each node may maintain a rendering history for multiple other nodes. Also, each node may send out its own rendering information sets to multiple other nodes. Thus, with this system, each node may follow any other node, and any node may leave the collaboration discussion, and come back at a later time without missing any of the discussion.

These and other aspects of the present invention will be discussed in greater detail in the following sections.

DETAILED DESCRIPTION OF EMBODIMENT(S)

System Overview

Figure 1:
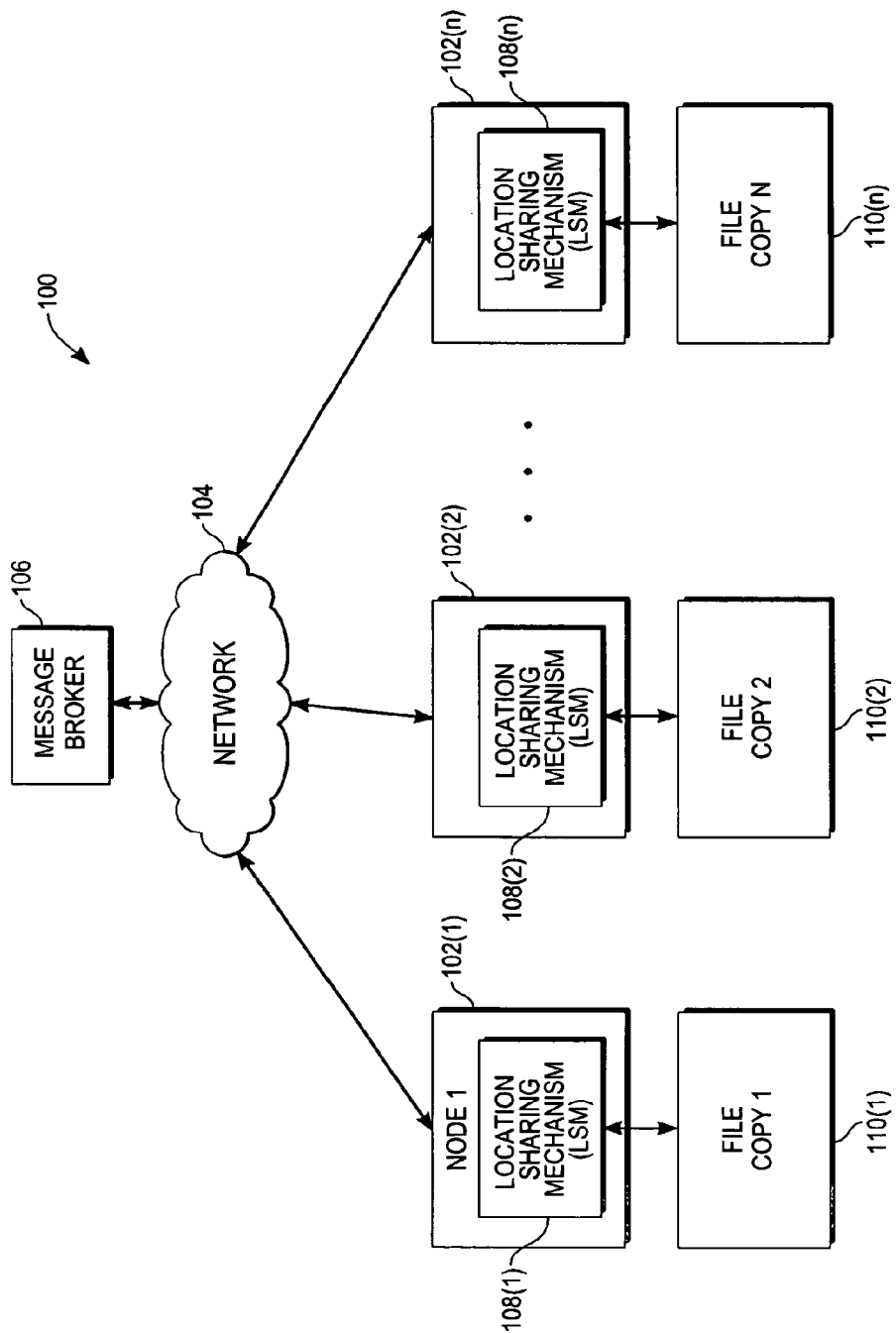
FIG. 1 is a functional block diagram of a system in which one embodiment of the present invention may be implemented.

With reference to FIG. 1, there is shown a functional block diagram of a system 100 in which one embodiment of the present invention may be implemented. As shown, the system 100 comprises a plurality of nodes 102, and a network 104 for communicatively coupling the nodes 102 to each other. For purposes of the present invention, the network 104 may be any type of network, including but not limited to, a local area network (LAN) and a wide area network (WAN), such as the Internet. Anything that enables the nodes 102 to communicate with each other may be used as network 104.

For purposes of the present invention, each node 102 may be any device that can couple to a network 104 and interact with other nodes 102 to collaborate on a file 110. As an example, a node 102 may be a desktop or portable computer, such as the sample computer system shown in FIG. 5. In one embodiment, each node 102 comprises one or more user interface components that enable the node 102 to receive input from, and provide output to, a user. For example, a node 102 may comprise a keyboard and a cursor control device (e.g. a mouse, trackball, stylus, pointing device, etc.) to enable a user to make user interface selections and to enter alpha numeric data. A node 102 may also comprise a display for displaying information, such as a portion of a file, to a user.

To enable it to collaborate on the file 110 with one or more other nodes 102, each node 102 comprises a location sharing mechanism (LSM) 108. In one embodiment, it is this LSM 108 on each node 102 that tracks a user's access in file 110, generating corresponding rendering information, and propagates the rendering information to other nodes 102 in the system 100. It is also the LSM 108 that enables a node to receive rendering information for the file 100 from other nodes. The operation of the LSM 108 will be elaborated upon in a later section. For purposes of the present invention, the functionality of the LSM 108 may be implemented in various ways. For example, if a node 102 takes the form of a computer, then the LSM 108 may be implemented as a set of instructions executed by the computer. As an alternative, the LSM 108 may be implemented using hardwired logic components, such as that embodied in an ASIC. These and other implementations of the LSM 108 are within the scope of the present invention.

In addition to the nodes 102 and the network 104, the system 100 may also optionally comprise a message broker 106. In one embodiment, the message broker 106 facilitates communication between the various nodes 102 by receiving a message from one node 102 and forwarding that message to the other nodes. By doing so, the message broker 106 allows the nodes to communicate with each other by interacting with just one central component (the message broker 106). For purposes of the present invention, the functionality of the message broker 106 may be implemented in various ways. For example, it may be implemented by having a computer execute a set of instructions. Alternatively, the functionality of the message broker 106 may be implemented using hardwired logic components, such as that embodied in an ASIC. These and other implementations are within the scope of the present invention. As an alternative to message broker 106, the nodes 102 may communicate with each other in a peer-to-peer fashion. This and other embodiments are within the scope of the present invention.

As alluded to previously, each node 102 may access a file 110. The access permits a user on each node to view the file 110 by opening the file 110, displaying a portion of the opened file, selecting a section of the portion displayed or placing a location indicator such as a cursor inside the portion. Since the access required for this invention is not for editing, but rather for reading and viewing, the file 110 can be located anywhere in the system 100 as long as the file 110 can be accessed by all the nodes. Furthermore, because each node 102 only requires a read access to the file 110, it is possible for multiple users on multiple nodes to access the file at the same time.

In one embodiment, each node 102 maintains its own distinct copy of the file 110. Thus, as shown in FIG. 1, node 102(1) maintains a first copy 110(1) of the file, node 102(2) maintains a second copy 110(2) of the file, and node 102(n) maintains an nth copy 110(n) of the file. When done properly, this enables a user on one node to see a rendering history for the file 110 by a user on another node. The users on the various nodes are thus able to collaborate on the file 110.

Figure 2:
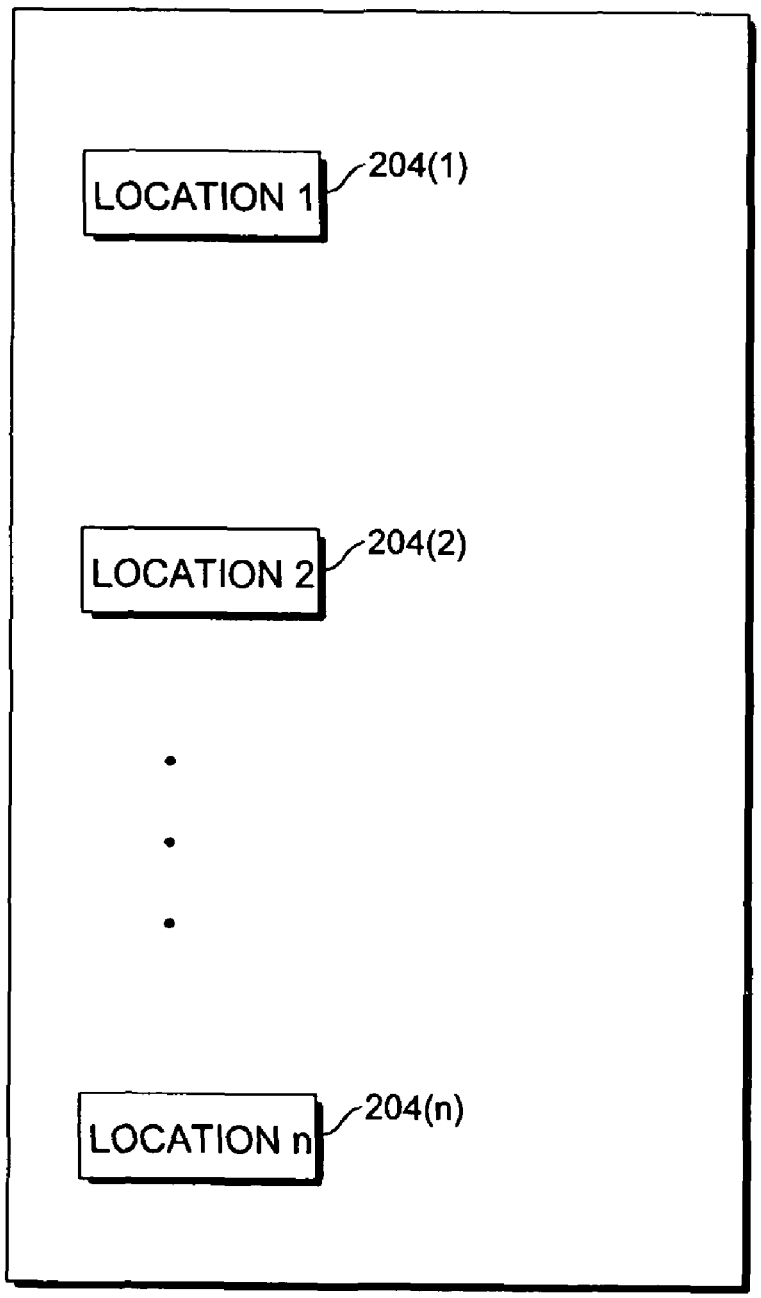
FIG. 2 shows an example of a file that can be collaboratively shared among a plurality of nodes, in accordance with one embodiment of the present invention.

FIG. 2 shows an example of a file 110 that may be accessed by a plurality of nodes 102. For purposes of the present invention, a file 110 may be any type of file. For example, such file may be a text file, a word processing file, a graphics file, etc. As shown, file 110 comprises a set of locations 204. Each location 204 may have any desired level of granularity. For example, if the file 110 is a text file, a location may be a location of a single character of text, a word of text, a line of text, or multiple lines of text. For purposes of the present invention, each location 204 may represent as small or as large a granularity of information as desired.

In one embodiment, each file 110 has a relative file name associated therewith. This relative file name uniquely identifies a particular file 110. In the example of FIG. 2, relative file name (RFN) is associated with file 110. In one embodiment, this relative file name-file association is maintained across all copies of the file 110. Thus, regardless of which copy of the file 110, and regardless of which node 102 is hosting the copy of the file, relative file name 1 is associated with file 110. As will be made clear in a later section, keeping these associations consistent across all copies of the file 110 simplifies the process of accessing the various copies.

In one embodiment, the relative file name for a file 110 is constant on all the nodes for that file, although the root path for the file may, even though is not required to, vary from node to node. Each node has its root path for the file specified as a value of an environment variable. A relative file name of a file 110 can be combined with the root path for the file on a particular node to form an absolute file name of the file on that node. For example, on a node running Solaris 10, commercially available from Sun Microsystems, Mountain View, Calif., a root path for a file may be specified as a value of an environment variable named "ROOT_PATH" as part of a user's login profile, while a relative file name for the file may be "src/program.c", the latter of which is constant across all the nodes in one embodiment. Suppose the environment variable "ROOT_PATH" is set to a value of "/home/project/". The combination of the root path with the relative file name would be "/home/project/src/program.c", which forms an absolute file name of the file on the node.

Sample Operation of System

Figure 3A:
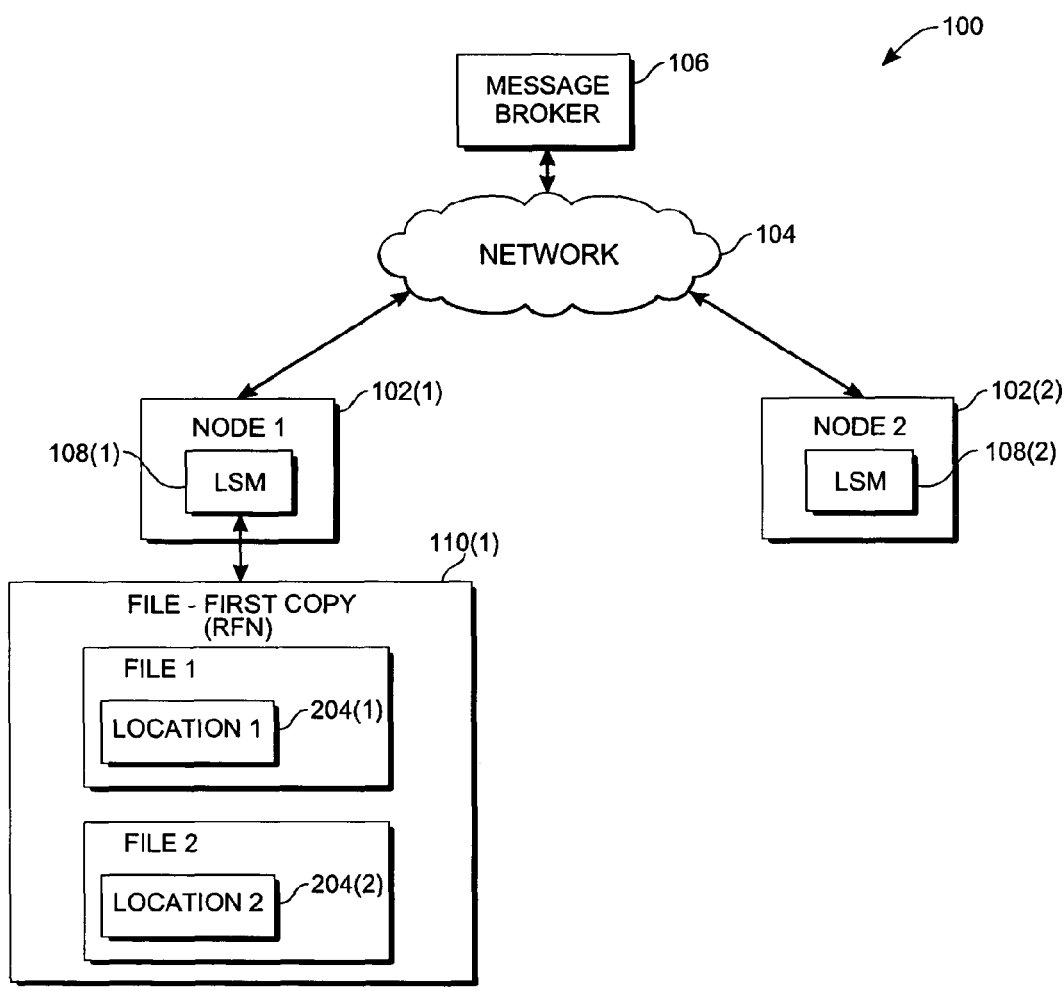
FIGS. 3A-3D illustrate the various stages of collaborating on a file between multiple nodes, in accordance with one embodiment of the present invention.
Figure 3B:
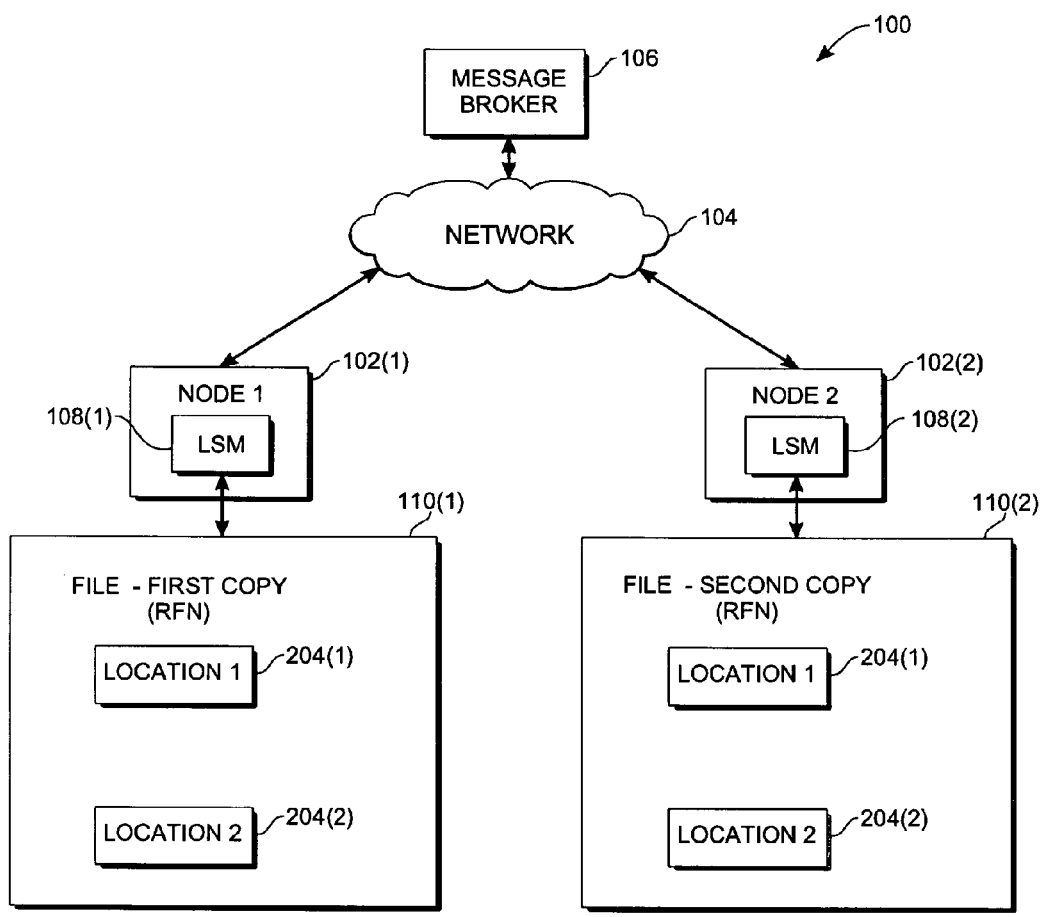

To illustrate how rendering information for a file may be collaboratively exchanged among a plurality of nodes 102 in accordance with one embodiment of the present invention, reference will now be made to an example. In the following discussion, reference will be made to the system diagrams of FIGS. 3A-3D, and to the operational diagram of FIG. 4. FIG. 4 shows the operation of the LSM 108(1) on node 1 102(1) in accordance with one embodiment of the present invention. In the following discussion, it will be assumed that collaboration is implemented between two nodes 102(1), 102(2) (FIG. 3A). It will also be assumed that the file being shared is the file shown in FIG. 2. For the sake of simplicity, only one file 110 is shown in FIGS. 3A-3D. It will also be assumed that node 1 102(1) can secure access to the file (see FIG. 3A; block 402 of FIG. 4).

Initially, rendering information for the file 110 is not exchanged. To enable it to be exchanged, the LSM 108(1) of node 1 102(1), under direction of a first user, sends a message (which, in one embodiment, includes the name of the first user and network address of node 1 102(1)) to message broker 106 to start a collaboration session. In one embodiment, this and all other messages are sent using an instant messaging protocol. For purposes of the present invention, any messaging protocol may be used, including but not limited to XMPP (extensible messaging and presence protocol). In response to this message, the message broker 106 starts a collaboration session, gives that session a session ID, and adds the name of the first user and network address of node 1 102(1) to the session. The message broker 106 then returns the session ID to LSM 108(1). Thereafter, LSM 108(1), using the session ID, sends a message (which, in one embodiment, includes the name of the file) to the message broker 106 to add the file to the session. Rendering information for the file may now be collaboratively exchanged with other nodes as part of the collaboration session.

At some point, the LSM 108(1) of node 1 102(1), under direction of the first user, sends an invitation to the message broker 106 to invite node 2 102(2) to join the collaboration session. In one embodiment, this invitation message comprises the session ID, and the relative file name of the file 110 and network address of node 2 102(2). In turn, the message broker 106 forwards the invitation to node 2 102(2). At that point, a second user on node 2 102(2) can accept or decline the invitation. If the invitation is declined, then LSM 108(2) on node 2 102(2) sends a decline message to the message broker 106, which forwards the message to node 1 102(1). Node 1 102(1) is thus informed that its invitation has been declined. However, if the invitation is accepted, then LSM 108(2) on node 2 102(2) sends an accept message to the message broker 106. In response, the message broker 106 adds the name of a second user and network address of node 2 102(2) to the session, and forwards the accept message to node 1 102(1). Node 2 102(2) is thus added to the session, and node 1 102(1) is informed of the acceptance by node 2 102(2).

Thereafter, using the session ID, LSM 108(2) on node 2 102(2) sends a join message to the message broker 106. Upon receiving this message, the message broker 106, forwards the join message to all of the other nodes in the collaboration session (which, in this example, is node 1 102(1)). The message broker 106 sends the name of the file to the LSM 108(2) on node 2 102(2). As shown in FIG. 3B, the LSM 108(2) now secures its own access to a copy 110(2) of the file. With that done, the nodes 102(1), 102(2) are now ready to collaborate on the file. At all time, the two copies 110(1), 110(2) of the file are identical in its content.

To enable users to exchange rendering information for the file, each of the LSM's 108(1), 108(2) generates a first display of users in the collaboration session in a first section of a user interface (block 404 of FIG. 4). Each of the LSM's 108(1), 108(2) is prepared to receive an indication that a user on the first display has been selected. Any time upon receiving such indication, an LSM 108 renders the selected user's rendering history for the file 110 in a second section of a user interface.

Suppose now that the LSM 108(1) on the first node 102(1) receives an indication that the first user is navigating a location 206(1) in file 110(1) (block 406 of FIG. 4). The first copy 110(1) of the file is thus accessed. The LSM 108(1) on node 1 102(1) generates and stores a first set of rendering information 304(1) into the first user's rendering history. At this point, only the first node 102(1) has the rendering information of the access. The rendering information has not been propagated to the other nodes.

Suppose now that at the same time the first user is accessing the first copy 110(1) of the file, the LSM 108(2) on the second node 102(2) receives an indication that the second user is navigating a location 206(2) of the second copy 110(2) of the file. The second copy 110(2) of the file is thus accessed. The LSM 108(2) on node 2 102(2) generates and stores a second set of rendering information 304(2) into the second user's rendering history. At this point, only the second node 102(2) has the rendering information of the access. The rendering information has not been propagated to the other nodes.

The second user on node 2 102(2) may access the location 206(2) in file 110(2) at the same time that the first user on node 1 102(1) is accessing the location in file 110(1). In some situations, multiple users on multiple nodes may access different locations of the file at the same time. In some further situations, location 206(2) on node 2 may even be the same as location 206(1) on node 1—that is, the first and second users are accessing the same location in the same file on their respective nodes.

For the purpose of illustration, only one file is used to show how multiple nodes may collaboratively share histories of access with respect to that one file. However, this invention is not limited to only one file. In some embodiments, a file 2 accessed by node 2 may even be a different file from a file 1 accessed by node 1—that is, the first and second users are accessing different files on their respective nodes. Where two or more files are collaboratively accessed, the same collaboration mechanism is used to enable multiple nodes to exchange histories of access with respect to the two or more files. These and other variations of accessing and collaborating on one or more files are within the scope of the present invention.

To propagate rendering information to all nodes in the collaboration session, the LSM's 108(1), 108(2) send out rendering information messages. Specifically, the LSM 108(1) on node 1 102(1) sends (block 408 of FIG. 4) a first rendering information message to the message broker 106. In one embodiment, this rendering information message comprises the name of the first user, the relative file name (relative file name 1) associated with file 110(1), and the first set of rendering information 304(1) comprising positioning information from which a first portion of file 110(1) viewed by the first user can be determined. Similarly, the LSM 108(2) on node 2 102(2) sends a second rendering information message to the message broker 106. In one embodiment, this rendering information message comprises the name of the second user, the relative file name (relative file name2) associated with region 2 202(2), and the second set of rendering information 304(2) comprising positioning information from which a second portion of file 110(2) viewed by the second user can be determined. In effect, these messages represent an attempt by each node to inform the other nodes in the collaboration session of the accesses that that user has made on that node in the file 110. Upon receiving these messages, the message broker 106 forwards the first rendering information message to the LSM 108(2) on node 2 102(2), and forwards the second rendering information message to the LSM 108(1) on node 1 102(1).

Figure 3C:
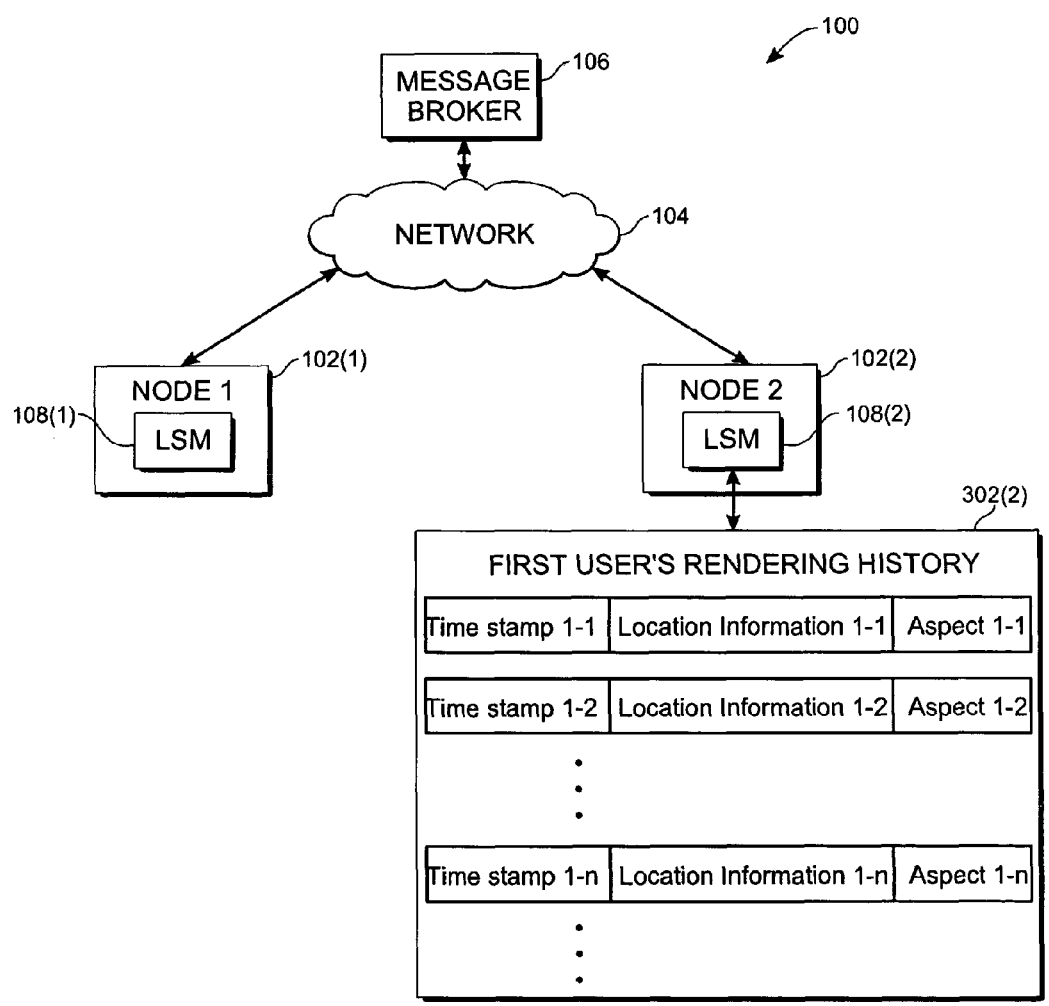
Figure 4:
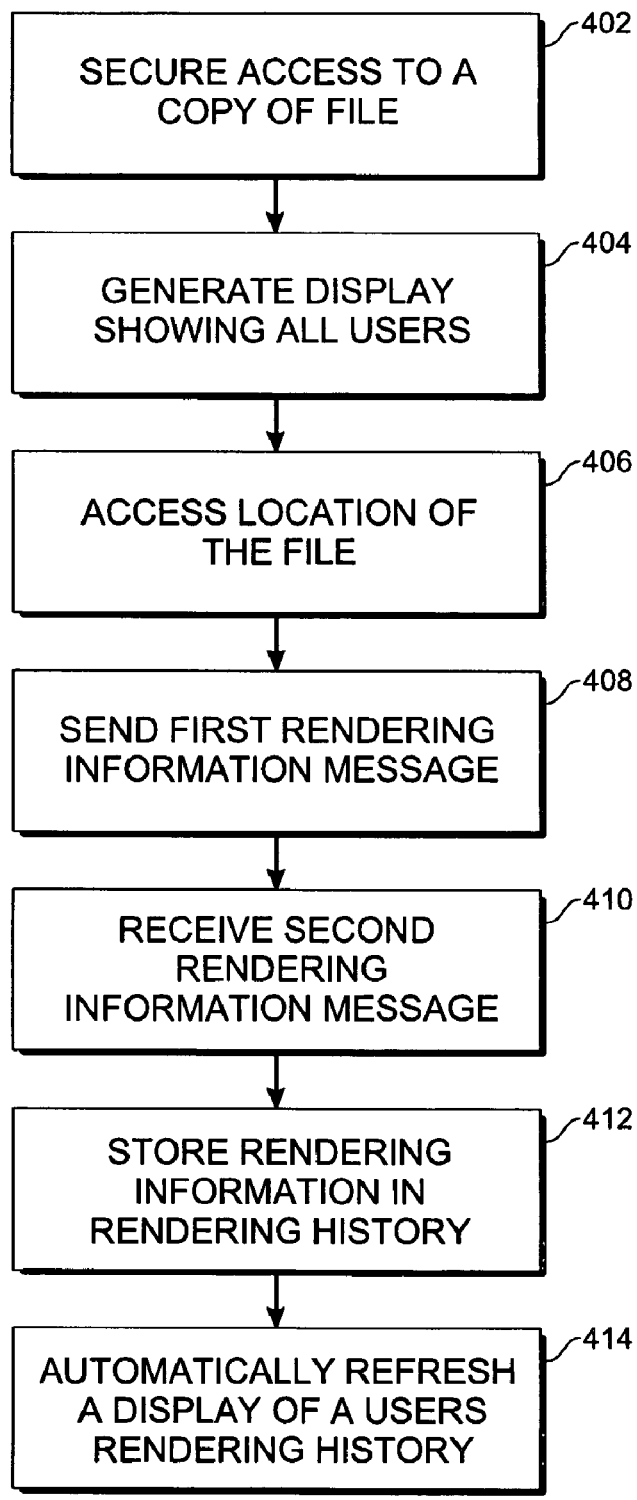
FIG. 4 is an operational diagram for a node, illustrating how a file is collaboratively shared in accordance with one embodiment of the present invention.

In response to the first rendering information message, the LSM 108(2) on node 2 102(2) stores the first set of rendering information 304(1) into the first user's rendering history (see FIG. 3C). Thereafter, if the first user's latest rendering history is being currently shown in a section of a user interface on node 2, the section is automatically refreshed to include the first set of rendering information 304(1). The second user on node 2 102(2) is thus able to see the set of rendering information generated by the first user on node 1 102(1).

In addition, the second user on node 2 102(2) may follow or track the first user's rendering history in another section of the user interface on node 2. In response to the first rendering information message, node 2 102(2) accesses a copy of the file indicated in the first set of rendering information 304(1), applies positioning information in the set of rendering information to the copy of the file to determine a first portion of the file that has been rendered by the first node, and renders the first portion of the file in the user interface on node 2. The second user on node 2 102(2) is thus able to see the portion of file 110 viewed by the first user on node 1 102(1).

Figure 3D:
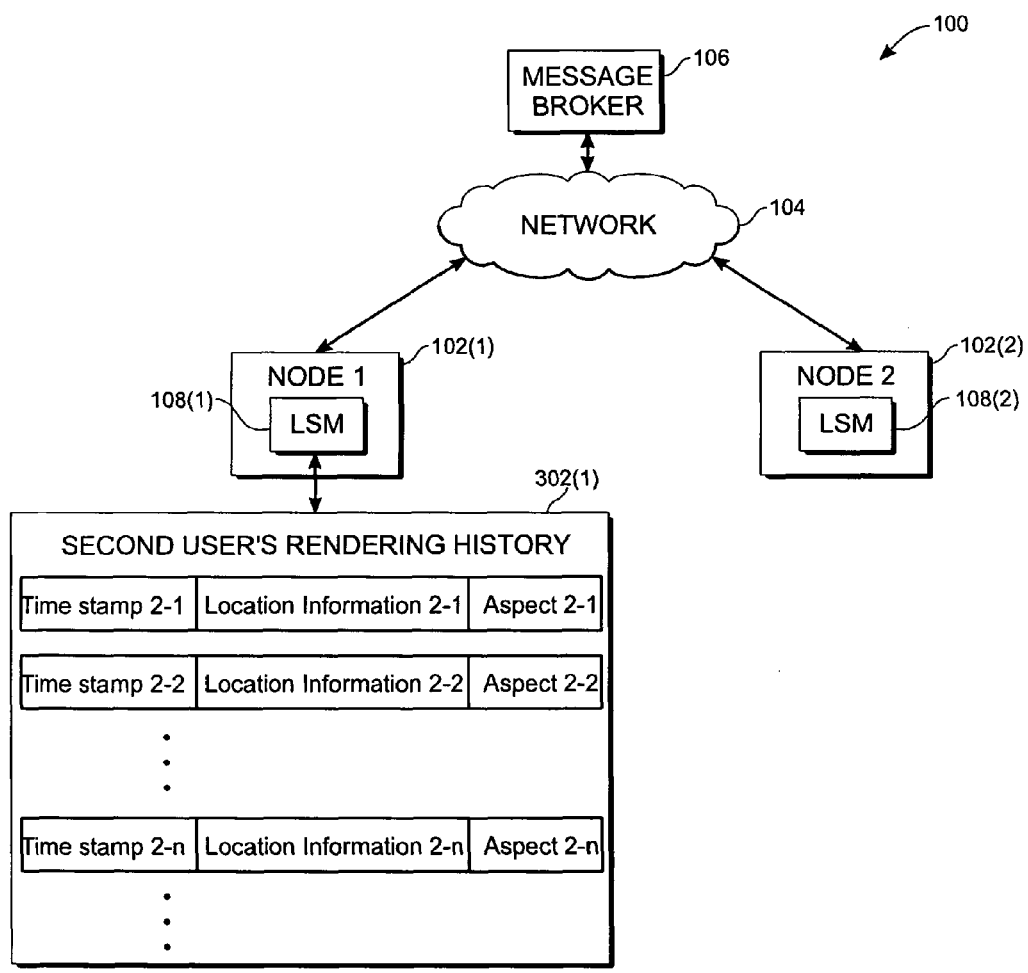

Similarly, upon receiving (block 410 of FIG. 4) the second rendering information message, the LSM 108(1) on node 1 102(1) stores the second set of rendering information 304(2) (block 412 of FIG. 4) into the second user's rendering history (see FIG. 3D). Thereafter, if the second user's latest rendering history is being currently shown in a section on node 1, the section is automatically refreshed to include the first set of rendering information 304(2) (block 414 of FIG. 4). The first user on node 1 102(1) is thus able to see the set of rendering information generated by the second user on node 2 102(2).

In addition, the first user on node 1 102(1) may follow or track the second user's rendering history in another section of the user interface on node 1. In response to the second rendering information message, node 1 102(1) accesses a copy of the file indicated in the second set of rendering information 304(2), applies positioning information in the set of rendering information to the copy of the file to determine a second portion of the file that has been rendered by the second node, and renders the second portion of the file in the user interface on node 1. The first user on node 1 102(1) is thus able to see the portion of file 110 viewed by the second user on node 2 102(2).

At some point, one or more of the nodes 102(1), 102(2) may wish to leave the collaboration session. To do so, the LSM 108 of the node 102 sends a leave message, comprising the session ID, to the message broker 106. In response, the message broker 106 removes that user's name and that node's network address from the session. When a leave message is received from the last node in a session, the message broker 106 removes that user's name and that node's network address from the session, and closes the session. The collaboration is thus completed.

In the above example, for the sake of simplicity, only two nodes 102(1), 102(2) are shown, and only one file is shown as being shared. However, it should be noted that the concepts taught above may be applied generally to other arrangements. Specifically, for purposes of the present invention, any number of files can be shared in a collaboration session, and any number of nodes can participate in a collaboration session.

Also, the above example shows that the first user on node 1 102(1) is accessing the location in file 110(1) at the same time that the second user on node 2 102(2) is accessing the location in file 110(2). This was done merely to highlight the ability of the system 100 to enable multiple users to access the file at the same time. This is not required. In fact, any of the actions described above may take place at any time relative to other actions. For example, the first user on node 1 102(1) may access the location of file 110(1) before, after, or at the same time as the second user on node 2 102(2) is accessing the location of file 110(2). Also, the first rendering information message may be sent before, after, or at the same time as the second rendering information message is received, and the second rendering information message may be sent before, after, or at the same time as the first rendering information message is received. In addition, the access of the file 110, and the refreshing of the sections in the user interfaces may occur at any time. For example, the LSM 108(1) on node 1 102(1) may access file 110(2) generating the second set of rendering information 304(2) at the same time that the first user on node 1 102(1) is accessing the location in file 110(1). Also, the LSM 108(1) on node 1 102(1) may refresh a section on a user interface to show the second set of rendering information 304(2) in file 110(2) at the same time that the first user on node 1 102(1) is navigating the location in file 110(1) (that way, the first user on node 1 102(1) is able to see the set of rendering information generated and the portion of the file viewed by the second user on node 2 102(2) while the first user is accessing the content in file 110(1)). Similarly, the LSM 108(2) on node 2 102(2) may access file 110(1) generating the first set of rendering information 304(1) at the same time that the second user on node 2 102(2) is navigating the location in file 110(2). Also, the LSM 108(2) on node 2 102(2) may refresh a section on a user interface to show the first set of rendering information 304(1) in file 1 202(1) at the same time that the second user on node 2 102(2) is accessing the location in file 110(2) (hence, the second user on node 2 102(2) is able to see the set of rendering information generated and the portion of the file viewed by the first user on node 1 102(1) while the second user is accessing the location in file 110(2)). These and other orders of operation are possible and are within the scope of the present invention.

Hardware Overview

Figure 5:
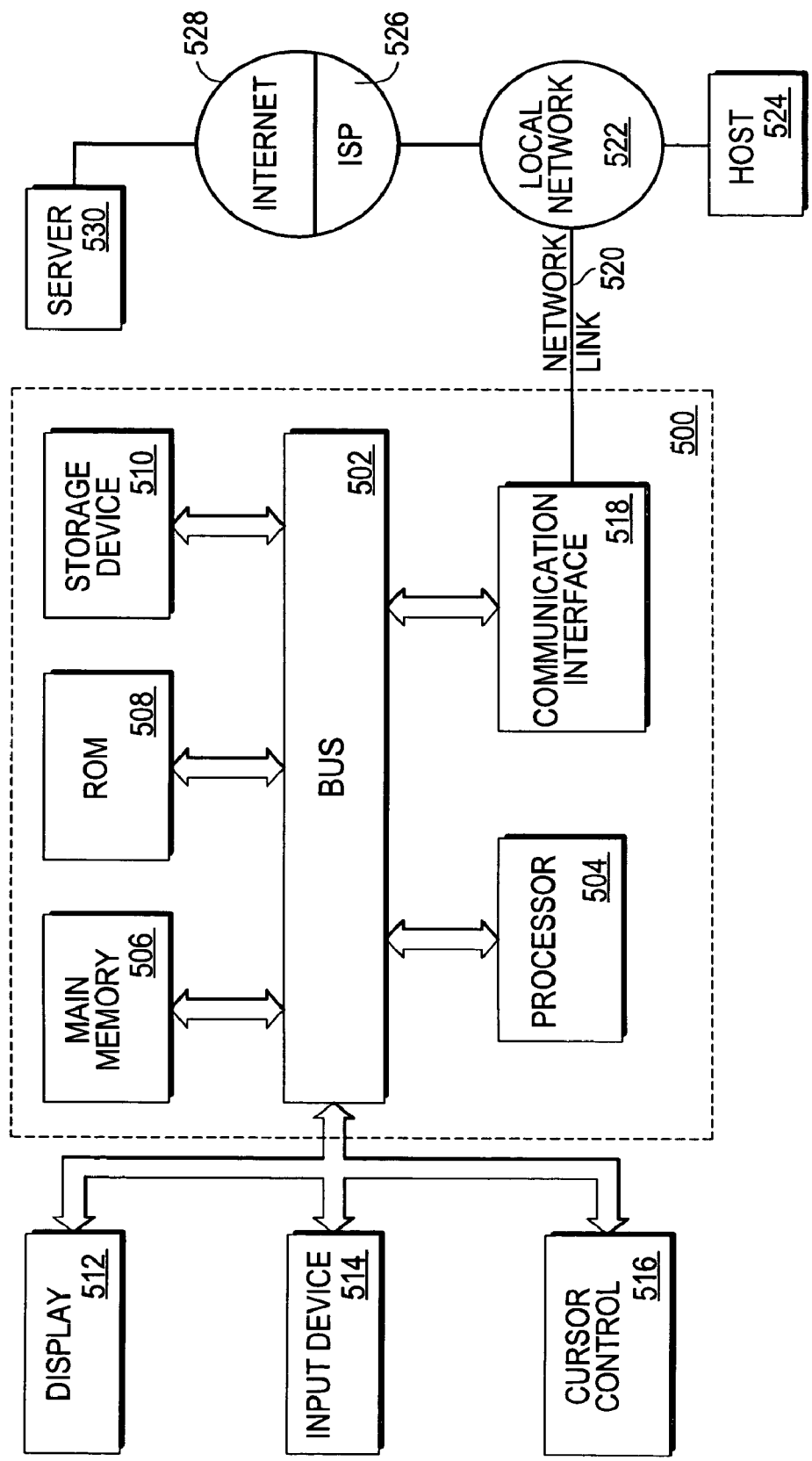
FIG. 5 is a block diagram of a general purpose computer system in which one embodiment of the present invention may be implemented.

FIG. 5 is a block diagram that illustrates a computer system 500 upon which an embodiment of the invention may be implemented. Computer system 500 includes a bus 502 for facilitating information exchange, and one or more processors 504 coupled with bus 502 for processing information. Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions by processor 504. Computer system 500 may further include a read only memory (ROM) 508 or other static storage device coupled to bus 502 for storing static information and instructions for processor 504. A storage device 510, such as a magnetic disk or optical disk, is provided and coupled to bus 502 for storing information and instructions.

Computer system 500 may be coupled via bus 502 to a display 512 for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

In computer system 500, bus 502 may be any mechanism and/or medium that enables information, signals, data, etc., to be exchanged between the various components. For example, bus 502 may be a set of conductors that carries electrical signals. Bus 502 may also be a wireless medium (e.g. air) that carries wireless signals between one or more of the components. Bus 502 may further be a network connection that connects one or more of the components. Any mechanism and/or medium that enables information, signals, data, etc., to be exchanged between the various components may be used as bus 502.

Bus 502 may also be a combination of these mechanisms/media. For example, processor 504 may communicate with storage device 510 wirelessly. In such a case, the bus 502, from the standpoint of processor 504 and storage device 510, would be a wireless medium, such as air. Further, processor 504 may communicate with ROM 508 capacitively. Further, processor 504 may communicate with main memory 506 via a network connection. In this case, the bus 502 would be the network connection. Further, processor 504 may communicate with display 512 via a set of conductors. In this instance, the bus 502 would be the set of conductors. Thus, depending upon how the various components communicate with each other, bus 502 may take on different forms. Bus 502, as shown in FIG. 5, functionally represents all of the mechanisms and/or media that enable information, signals, data, etc., to be exchanged between the various components.

The invention is related to the use of computer system 500 for implementing the techniques described herein. According to one embodiment of the invention, those techniques are performed by computer system 500 in response to processor 504 executing one or more sequences of one or more instructions contained in main memory 506. Such instructions may be read into main memory 506 from another machine-readable medium, such as storage device 510. Execution of the sequences of instructions contained in main memory 506 causes processor 504 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing data that causes a machine to operation in a specific fashion. In an embodiment implemented using computer system 500, various machine-readable media are involved, for example, in providing instructions to processor 504 for execution. Such a medium may take many forms, including but not limited to, non-volatile media, volatile media, and transmission media. Non-volatile media includes, for example, optical or magnetic disks, such as storage device 510. Volatile media includes dynamic memory, such as main memory 506. Transmission media includes coaxial cables, copper wire and fiber optics, including the wires that comprise bus 502. Transmission media can also take the form of acoustic or light waves, such as those generated during radio-wave and infra-red data communications.

Common forms of machine-readable media include, for example, a floppy disk, a flexible disk, hard disk, magnetic tape, or any other magnetic medium, a CD-ROM, DVD, or any other optical storage medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of machine-readable media may be involved in carrying one or more sequences of one or more instructions to processor 504 for execution. For example, the instructions may initially be carried on a magnetic disk of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are exemplary forms of carrier waves transporting the information.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, and/or stored in storage device 510, or other non-volatile storage for later execution. In this manner, computer system 500 may obtain application code in the form of a carrier wave.

At this point, it should be noted that although the invention has been described with reference to a specific embodiment, it should not be construed to be so limited. Various modifications may be made by those of ordinary skill in the art with the benefit of this disclosure without departing from the spirit of the invention. Thus, the invention should not be limited by the specific embodiments used to illustrate it but only by the scope of the issued claims and the equivalents thereof.

What is claimed is:

1. A method for distributed review comprising:
   receiving, by a first node from a second node, an identifier of a file and first positioning information identifying a first portion of the file displayed on the second node;
   opening, on the first node, a copy of the file based on the identifier of the file;
   identifying a second portion in the copy of the file based on the first positioning information, wherein the second portion is a copy of the first portion;
   displaying the second portion on the first node;
   receiving, by the first node, a stop request to stop following the second node;
   after receiving the stop request and prior to receiving a resume request:
      receiving, from the second node, second positioning information identifying a third portion of the file displayed on the second node at a first point in time;
      receiving, from the second node, third positioning information identifying a fourth portion of the file displayed on the second node, wherein the fourth portion of the file is displayed on the second node after the third portion at a second point in time;
      receiving, from the second node, fourth positioning information identifying a fifth portion of the file displayed on the second node, wherein the fifth portion of the file is displayed on the second node after the fourth portion at a third point in time; and
      storing, by the first node, in a rendering history, the second positioning information associated with the first point in time, the third positioning information associated with the second point in time, and the fourth positioning information associated with the third point in time;
   receiving a resume request to resume following the second node starting at the second point in time; and
   displaying, only after receiving the resume request, a sixth portion on the first node, wherein the displaying is based on the third positioning information and the resume request to start at the second point in time, and wherein the sixth portion is a copy of the fourth portion.

2. The method of claim 1, further comprising:
   receiving a request from a user using the first node to navigate to a seventh portion in the copy of the file; and
   displaying, in response to the request, the seventh portion on the first node.

3. The method of claim 2, wherein the request is received and the seventh portion is displayed after receiving the stop request and prior to receiving the resume request.

4. The method of claim 2, further comprising:
   sending, by the first node, fifth positioning information identifying the seventh portion,
   wherein the second node displays an eighth portion based on receiving the fifth positioning information identifying the seventh portion, wherein the eighth portion is a copy of the seventh portion.

5. The method of claim 4, wherein the fifth positioning information is in transit between the first node and the second node while the second positioning information is in transit between the second node and the first node.

6. The method of claim 1, wherein the identifier of the file and the first positioning information are received in a single rendering information message, and wherein the single rendering information message further comprises a user identifier of a user using the second node.

7. The method of claim 1, wherein the first positioning information and the second positioning information are received from a message broker, wherein the message broker receives the first positioning information and the second positioning information from the second node.

8. A first node comprising:
   memory;
   a processor; and
   instructions, stored in the memory, for causing the processor to:
      receive, from a second node, an identifier of a file and first positioning information identifying a first portion of the file displayed on the second node;
      open a copy of the file based on the identifier of the file;
      identify a second portion in the copy of the file based on the first positioning information, wherein the second portion is a copy of the first portion;
      display the second portion on the first node;
      receive a stop request to stop following the second node;
      after receiving the stop request and prior to receiving a resume request:
         receive, from the second node, second positioning information identifying a third portion of the file displayed on the second node at a first point in time;
         receive, from the second node, third positioning information identifying a fourth portion of the file displayed on the second node, wherein the fourth portion of the file is displayed on the second node after the third portion at a second point in time;
         receive, from the second node, fourth positioning information identifying a fifth portion of the file displayed on the second node, wherein the fifth portion of the file is displayed on the second node after the fourth portion at a third point in time; and
         store, in a rendering history, the second positioning information associated with the first point in time, the third positioning information associated with the second point in time, and the fourth positioning information associated with the third point in time;

receive a resume request to resume following the second node starting at the second point in time; and display, only after receiving the resume request a sixth portion on the first node, wherein the displaying is based on the third positioning information and the resume request to start at the second point in time, and wherein the sixth portion is a copy of the fourth portion.

9. The first node of claim 8, wherein the instructions further cause the processor to:

receive a request from a user using the first node to navigate to a seventh portion in the copy of the file; and display, in response to the request, the seventh portion on the first node.

10. The first node of claim 9, wherein the request is received and the seventh portion is displayed after receiving the stop request and prior to receiving the resume request.

11. The first node of claim 9, wherein the instructions further cause the processor to:

send, by the first node, fifth positioning information identifying the seventh portion, wherein the second node displays an eighth portion based on receiving the fifth positioning information identifying the seventh portion, wherein the eighth portion is a copy of the seventh portion.

12. The first node of claim 11, wherein the fifth positioning information is in transit between the first node and the second node while the second positioning information is in transit between the second node and the first node.

13. The first node of claim 8, wherein the identifier of the file and the first positioning information are received in a single rendering information message, and wherein the single rendering information message further comprises a user identifier of a user using the second node.

14. The first node of claim 8, wherein the first positioning information and the second positioning information are received from a message broker, wherein the message broker receives the first positioning information and the second positioning information from the second node.

15. A non-transitory machine-readable media comprising instructions for causing a processor to:

receive, by a first node from a second node, an identifier of a file and first positioning information identifying a first portion of the file displayed on the second node;

open, on the first node, a copy of the file based on the identifier of the file;

identify a second portion in the copy of the file based on the first positioning information, wherein the second portion is a copy of the first portion;

display the second portion on the first node;

receive, by the first node, a stop request to stop following the second node;

after receiving the stop request and prior to receiving a resume request:

receive, from the second node, second positioning information identifying a third portion of the file displayed on the second node at a first point in time;

receive, from the second node, third positioning information identifying a fourth portion of the file displayed on the second node, wherein the fourth portion of the file is displayed on the second node after the third portion at a second point in time;

receive, from the second node, fourth positioning information identifying a fifth portion of the file displayed on the second node, wherein the fifth portion of the file is displayed on the second node after the fourth portion at a third point in time; and store, by the first node, in a rendering history, the second positioning information associated with the first point in time, the third positioning information associated with the second point in time, and the fourth positioning information associated with the third point in time;

receiving a resume request to resume following the second node starting at the second point in time; and display, only after receiving the resume request, a sixth portion on the first node, wherein the displaying is based on the third positioning information and the resume request to start at the second point in time, and wherein the sixth portion is a copy of the fourth portion.

16. The non-transitory machine-readable media of claim 15, wherein the instructions further cause the processor to:

receive a request from a user using the first node to navigate to a seventh portion in the copy of the file; and display, in response to the request, the seventh portion on the first node.

17. The non-transitory machine-readable media of claim 16, wherein the request is received and the seventh portion is displayed after receiving the stop request and prior to receiving the resume request.

18. The non-transitory machine-readable media of claim 16, wherein the instructions further cause the processor to:

send, by the first node, fifth positioning information identifying the seventh portion, wherein the second node displays an eighth portion based on receiving the fifth positioning information identifying the seventh portion, wherein the eighth portion is a copy of the seventh portion.

19. The non-transitory machine-readable media of claim 18, wherein the fifth positioning information is in transit between the first node and the second node while the second positioning information is in transit between the second node and the first node.

20. The non-transitory machine-readable media of claim 15, wherein the identifier of the file and the first positioning information are received in a single rendering information message, and wherein the single rendering information message further comprises a user identifier of a user using the second node.

* * * * *